United States Patent
Rangineni et al.

(10) Patent No.: US 12,452,810 B2
(45) Date of Patent: Oct. 21, 2025

(54) WIRELESS METHODS, DEVICES AND SYSTEMS FOR RAPID SYNCHRONIZATION WITH PERIODIC BROADCAST LINK

(71) Applicant: Cypress Semiconductor Corporation, San Jose, CA (US)

(72) Inventors: Balasubramanyam Rangineni, San Diego, CA (US); Manamohan Mysore, Ramona, CA (US); Yu-Chia Lin, Hsinchu (TW)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 419 days.

(21) Appl. No.: 18/180,706

(22) Filed: Mar. 8, 2023

(65) Prior Publication Data
US 2024/0306105 A1    Sep. 12, 2024

(51) Int. Cl.
*H04W 56/00* (2009.01)
*H04W 48/10* (2009.01)

(52) U.S. Cl.
CPC ....... *H04W 56/0015* (2013.01); *H04W 48/10* (2013.01)

(58) Field of Classification Search
None
See application file for complete search history.

(56) References Cited

U.S. PATENT DOCUMENTS

| 11,665,214 B2 * | 5/2023 | Lee | H04W 56/001 |
| | | | 709/201 |
| 2018/0249310 A1 * | 8/2018 | Kim | H04W 8/005 |
| 2020/0059827 A1 * | 2/2020 | Arvidson | H04W 4/80 |

* cited by examiner

Primary Examiner — Hong S Cho

(57) ABSTRACT

A method can include monitoring at least one non-primary advertising channel for packets; determining if any of the packets received during a same periodic advertising interval of a periodic advertising link include synchronization data; in response to acquiring a packet with synchronization data, extracting synchronization data from the packet with synchronization data; and synchronizing to the periodic advertising link with the synchronization data to determine timing for at least one download window in each periodic advertising interval. The periodic advertising interval includes a plurality of periodic sub-intervals and the at least one download window corresponds to at least one of the sub-intervals. Corresponding devices and systems are also disclosed.

20 Claims, 14 Drawing Sheets

FIG. 6A (BACKGROUND)

WIRELESS METHODS, DEVICES AND SYSTEMS FOR RAPID SYNCHRONIZATION WITH PERIODIC BROADCAST LINK

TECHNICAL FIELD

The present disclosure relates generally to wireless devices and systems, and more particularly to wireless devices and systems that include periodic, broadcast (e.g., advertising) messaging.

BACKGROUND

Many wireless systems can include a broadcasting feature to transmit on a designated channel to multiple devices. For example, Bluetooth low energy (BLE) can include periodic advertising broadcast as a logical transport for sending broadcast control and user data to all scanning devices in a given area. Such a broadcast can include a periodic, one-way transmissions to which scanning devices can be synchronized. Once synchronized, scanning devices can monitor designated time periods for broadcast packets.

Other advertising approaches have been proposed in which a central device can broadcast to many devices, with an option for those devices to respond back. In such a system, a scanning device (e.g., synchronized receiver) can acquire periodic synchronization by listening at periodic advertising response anchor points separated from one another by periodic advertising intervals. To ensure a system can accommodate a large number of scanning devices, a periodic advertising interval can be relatively large (e.g., 1, 2 or even 4 seconds) or even tens of seconds in worst case situations. Consequently, a new scanning device wishing to join the advertising link may need to wait an entire periodic advertising interval to acquire the stream.

While such relatively long acquisition times can be suitable for some applications, for many applications and/or user experiences such a delay is undesirable. Further, long acquisition times consume power as a scanning device can scan one or more advertising intervals in search of an anchor point and synchronization data for the advertising link.

Any ability to reduce synchronization time and/or power involved in synchronization operations would a welcome advance over the existing art.

BRIEF DESCRIPTION OF THE DRAWINGS

FIGS. 6A and 6B are timing diagrams showing the transmission of synchronization information according to a conventional method and according to an embodiment.

DETAILED DESCRIPTION

According to embodiments, a broadcasting (e.g., advertising) device can create a one or more periodic advertising links having a repeating advertising interval with sub-intervals. Multiple packets with synchronization data can be transmitted in a same advertising interval. A scanning device (e.g., receiver) can acquire synchronization data from any of the timing packets, as opposed to scanning a primary advertising channel for a packet transmitted once each advertising interval. With such advertising data, a scanning device synchronize to an advertising link. The multiple timing packets can be transmitted on channels not designated for advertising (e.g., not transmitted on any primary advertising channel).

In some embodiments, packets with synchronization data can be transmitted during multiple sub-intervals of a same advertising interval. In some embodiments, packets with synchronization data can be transmitted during all sub-intervals of a same advertising interval on a same advertising channel.

In some embodiments, upon receiving a packet with synchronization data, a scanning device can transmit an acknowledgement packet. In some embodiments, upon receiving an acknowledgment packet, an advertising device can return application specific data that can identify one or more sub-intervals for reception by the scanning device.

Figure 1:
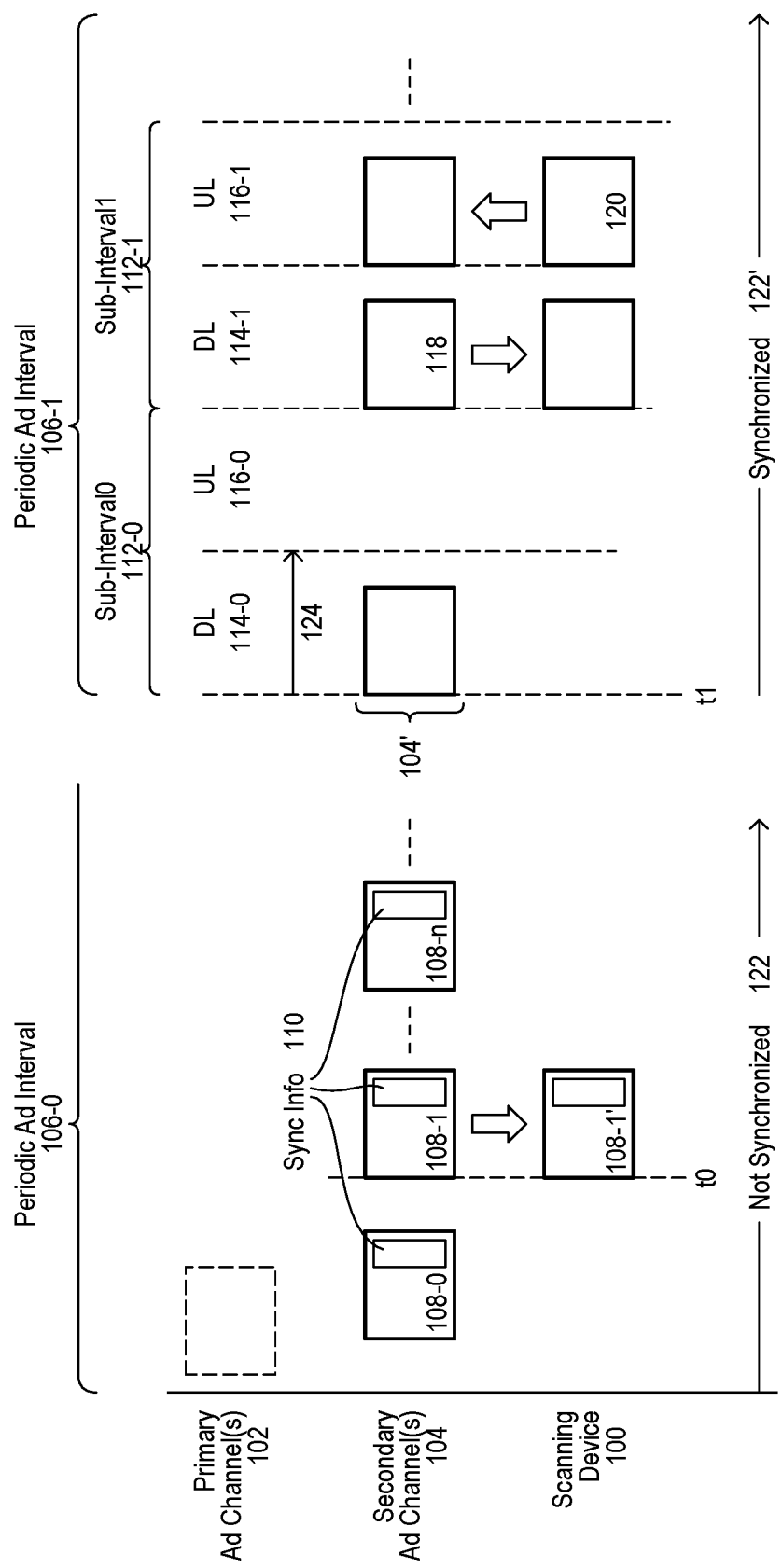
FIG. 1 is a timing diagram showing synchronization operations according to an embodiment.

FIG. 1 is a timing diagram showing operations of devices according to embodiments. FIG. 1 shows operations of a scanning device 100 interacting with a periodic advertising link on one or more broadcast (advertising) channels 104/104' created by an advertising device (not shown). A device 100 can receive and transmit packets compatible with a wireless standard. Channel(s) 104/104' can be channels that are not designated as advertising channels according to the standard (e.g., non-primary advertising channel).

An advertising link can include a repeating advertising (ad) interval which can include a number of sub-intervals. Further, the advertising link can include multiple packets with synchronization information (108-0 to 108-*n*) that are broadcast in the same ad interval 106-0/1. In FIG. 1, packets with synchronization information 108-0 to -n can be broadcast on a channel 104. Packets of an advertising link can be transmitted sequentially on a channel 104' (i.e., a train of packets), which may or may not be the same as channel 104.

Prior to time t0, a scanning device 100 may not be synchronized. That is, a scanning device does not have the synchronization data needed to time reception (and optionally transmission) windows with an advertising link.

At time t0, scanning device 100 can begin monitoring channel 104 for broadcast packets. Because multiple broadcast packets 108-0 to -n can be transmitted within the same periodic ad interval 106-0, a scanning device 100 can rapidly detect and receive a packet 108-1 with synchronization data 110. Using synchronization data, scanning device 100 can synchronize itself with the periodic ad interval (e.g., determine timing for periodic ad intervals 106-0/1 and sub-intervals within the periodic ad intervals).

At time t1, scanning device 100 is synchronized 122' with the advertising link, and thus can time its reception (and optionally transmission) of packets to one or more particular sub-intervals within each periodic interval. In the embodiment shown, an ad interval 106-0/1 can include sub-intervals (two shown as 112-0/1). Further, each sub-interval 112-0/1 can include download windows 114-0/1 in which an advertising device can broadcast packets, as well as upload windows 116-0/1 in which a scanning device 100 can broadcast packets.

In the embodiment shown, from synchronization information 110 or other broadcast information, a scanning device 100 can be assigned a sub-interval 112-1, and thus can time operations to receive a broadcast packet 118 in window 114-1 and can transmit an upload packet 120 in window 116-1.

In this way, a scanning device can scan one or more channels, not assigned as broadcast channels according to any current standard, for any of a number of packets that include synchronization information broadcast in the same ad interval. This can enable quick synchronization with advertising link.

Figure 2:
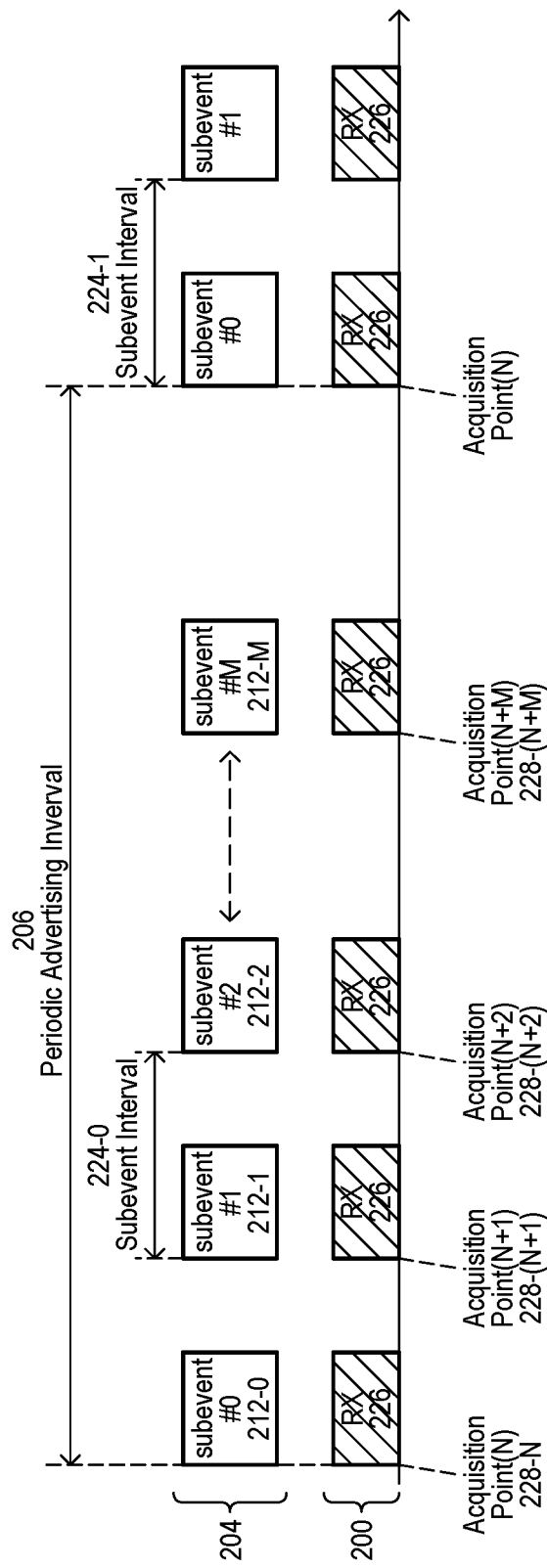
FIG. 2 is a timing diagram showing synchronization operations according to another embodiment.

FIG. 2 is a timing diagram showing operations of a scanning device 200 according to another embodiment. FIG. 2 shows operations of a scanning device 200 synchronizing with a periodic advertising link.

A periodic advertising link can include periodic ad intervals 206 with sub-intervals (two shown as 224-0/1). Packets with synchronization data 212-0 to 212-M can be transmitted on a channel 204 during multiple, consecutive sub-intervals, and in some embodiments all sub-intervals. A channel 204 may not be a channel designated as an advertising channel by a standard. Consequently, scanning device 200 can have multiple acquisition points 228-N to 228-N+M in every ad interval 206 by which synchronization data can be received (e.g., any of receive windows 226). This is in contrast to conventional approaches in which a scanning device has one acquisition point per ad interval to acquire synchronization data.

In some embodiments, a scanning device 200 can operate compatible with a BT standard having a periodic advertiser with response (PAwR) capability. In a PAwR-like embodiment, an ad interval (e.g., 206) can include periodic sub-events (e.g., 224-0/1) which can also include response periods in which a scanning device 200 can transmit data. A periodic synchronizer (e.g., scanning device 200) can acquire synchronization to a periodic advertiser with sub-events by obtaining synchronization information from secondary advertising PDUs (e.g., 212-0 to -M). Synchronization acquisition points (228-N to -(N+M)) can be spaced regularly, a periodic sub-interval (e.g., 224-0/1) apart. A failure to synchronize at acquisition point (228-N) can result in a synchronizer (e.g., 200) listening at next acquisition point (228-(N+1)) that follows in a next sub-event interval 224-1.

In this way, embodiments can include the regular, repeated transmission of packets with an ad interval that include synchronization information for a scanning device.

Figure 3:
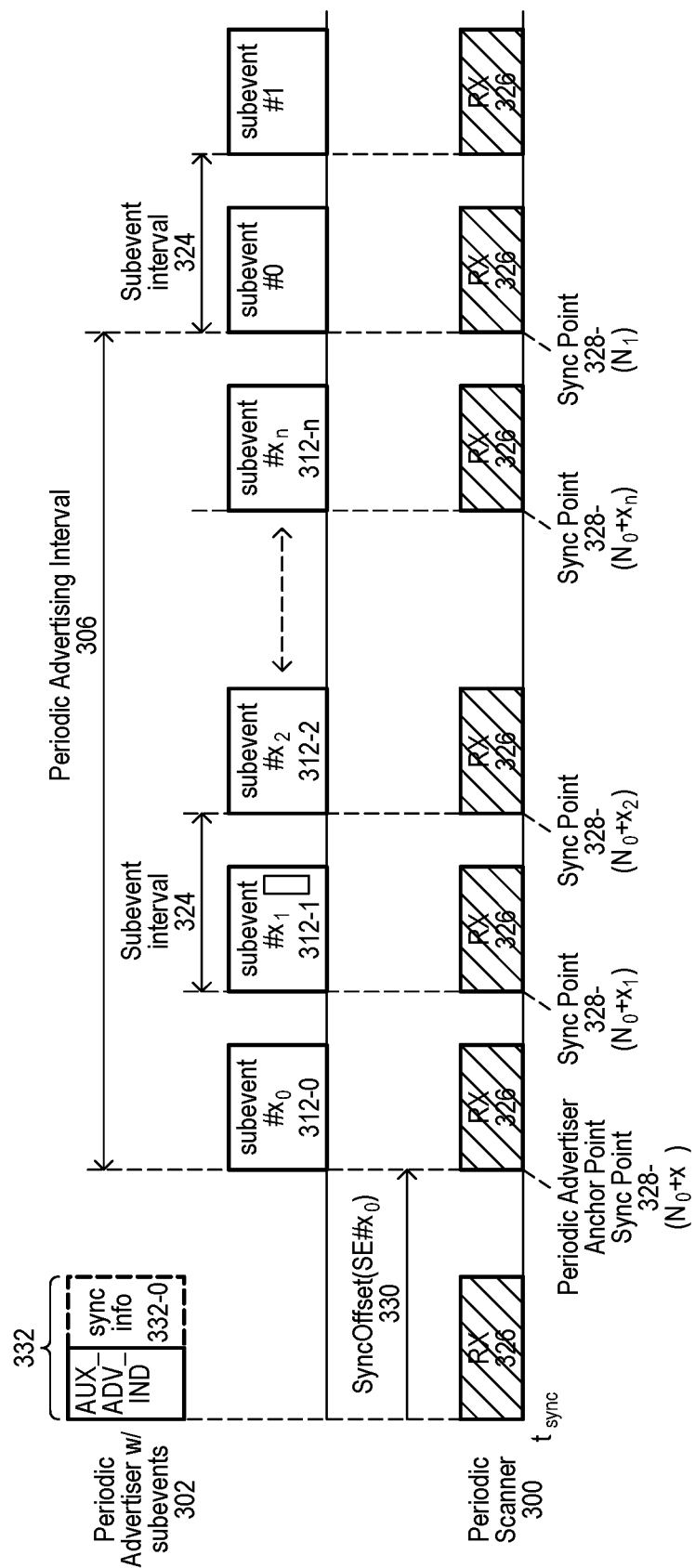
FIG. 3 is a timing diagram showing synchronization operations according to a further embodiment.

While embodiments can include synchronization information of any suitable form, in some embodiments synchronization information can identify a packet's position in a train with the synchronization information included in the packet. FIG. 3 shows operations of a scanning device 300 and a periodic advertiser (e.g., broadcaster) 302 according to an embodiment. FIG. 3 shows items like those of FIG. 2, but with a leading digit being a "3" instead of a "2".

A periodic advertiser 302 can transmit broadcast packets relative to a reference time $t_{sync}$. In the embodiment shown, a periodic advertiser 302 can transmit an advertising packet 332 on a primary advertising channel (i.e., a channel designated for advertising packets). An advertising packet 332 can include synchronization information 332-0 to enable a device to synchronize to a repeating advertising link.

An advertising link can include packets with synchronization data (312-0 to -n) at regular sub-intervals (e.g., 324) during a repeating ad interval 306. An ad interval 306 can be timed to start with respect to reference time $t_{sync}$. In the embodiment shown, an ad interval 306 can start after a sync offset time 330. Each packet with synchronization data (312-0 to -n) can include an identifier value that indicates its position in the train of sequential packets. A packet identifier value, along with other synchronization data (which can be included in the same packet) can be used by a scanning device 300 to determine the start of each ad interval 306 as well as the start of any of the sub-intervals.

In a BT PAwR-type embodiment, an advertising packet 332 can include an AUX_ADV_IND PDU. Sub-intervals can be sub-events and packets transmitted during sub-events can include other data, such as a sub-event counter (SE#N), which sequentially counts up from zero for each sub-event of the same ad interval. Using such data, a periodic synchronizer 300 can scan a sub-event packet for a count value and back calculate to determine a start of an ad interval. In one embodiment, such a calculation can include:

Periodic Advertiser Anchor Point =

$$\text{Sync point } (N_0 + x_n) = t_{sync} + SyncOffset(SE\#x_0)$$

Synch point $(N_0) =$ $$SyncPoint(N_0 + x) - SubeventInterval \times SubeventNumber(x)$$

where SubeventInterval is a duration of a sub-event (i.e., 324) and SubeventNumber(x) is the number identifying the subevent.

In this way, packets transmitted in sub-intervals of an ad interval can include extended synchronization data (i.e., data beyond that transmitted on a primary advertising channel) that can enable a scanning device to rapidly synchronize with an advertising link.

While embodiments can include extended synch info transmitted in sequential packets of a periodic advertising train, other embodiments can transmit extended synch info in packets between sub-interval reception times as well as on different channel(s) than the advertising train.

Figure 4:
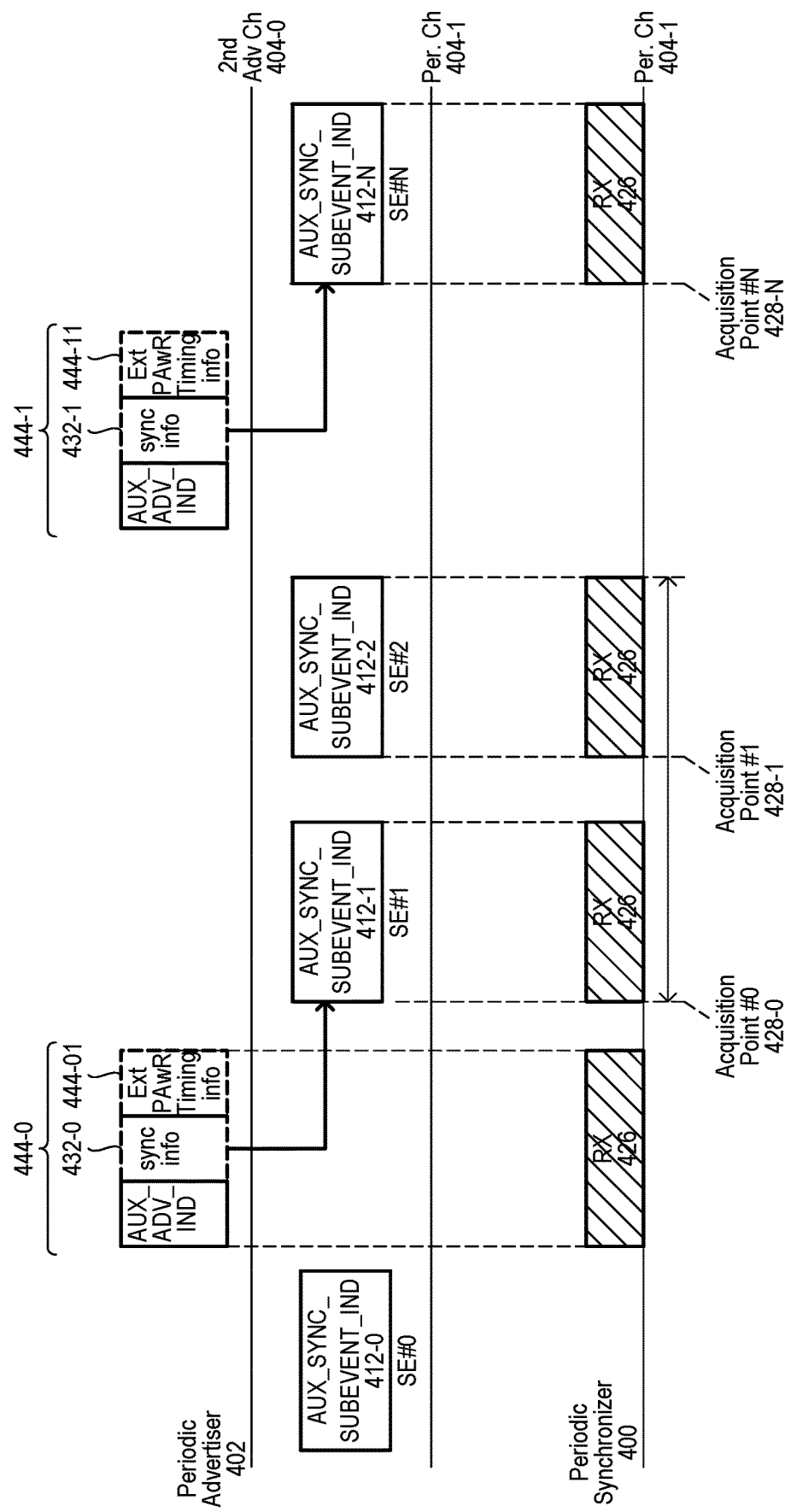
FIG. 4 is a timing diagram showing synchronization operations according to another embodiment.

FIG. 4 shows operations of a scanning device 400 and a periodic advertiser 402 according to another embodiment.

FIG. 4 shows items like those of FIG. 2, but with a leading digit being a "4" instead of a "2".

A periodic advertiser 402 can transmit a train of broadcast packets 412-0 to -N in an ad interval that can start relative to a reference time ($t_{sync}$) by an offset amount, as described for FIG. 3. However, unlike FIG. 3, advertising info packets with extended synchronization data (two possible examples shown as 444-0/1) can be transmitted between sub-intervals. Such packets can include extended synch info, including a sub-interval identifier for a next sub-interval of the train. Thus, advertising info packet 444-0 can precede, and contain an identifier for, packet 412-1. Likewise, advertising info packet 444-1 can precede, and contain an identifier for, packet 412-N. While FIG. 4 includes two advertising info packets 444-0/1, embodiments can include additional such packets transmitted prior to other sub-intervals. In some embodiments, advertising info packets 444-0/1 can be transmitted on a secondary advertising channel 404-0, which can be different from the channel 404-1 on which the train of packets 412-0 to -N is transmitted.

In a BT PAwR-type embodiment, advertising packets 444-0/1 can include AUX_ADV_IND PDU, which can have an ACAD field which carries Sync Info and a sub-event count for the immediately following subevent. A periodic synchronizer 400 can synchronize to the subevent specified in the Sync Info and back calculate expected SE#0 anchor point as described for FIG. 4.

In this way, a scanning device can synchronize to an advertising link using extended synch info transmitted by synchronization packets that precede packets in a periodic train of the advertising link.

While embodiments can provide advertising info packets at predetermined times within an ad interval, other embodiments can dynamically change when such packets are transmitted within the ad interval. In some embodiments, such changes in timing can occur as a configuration of an advertising link changes.

Figure 5:
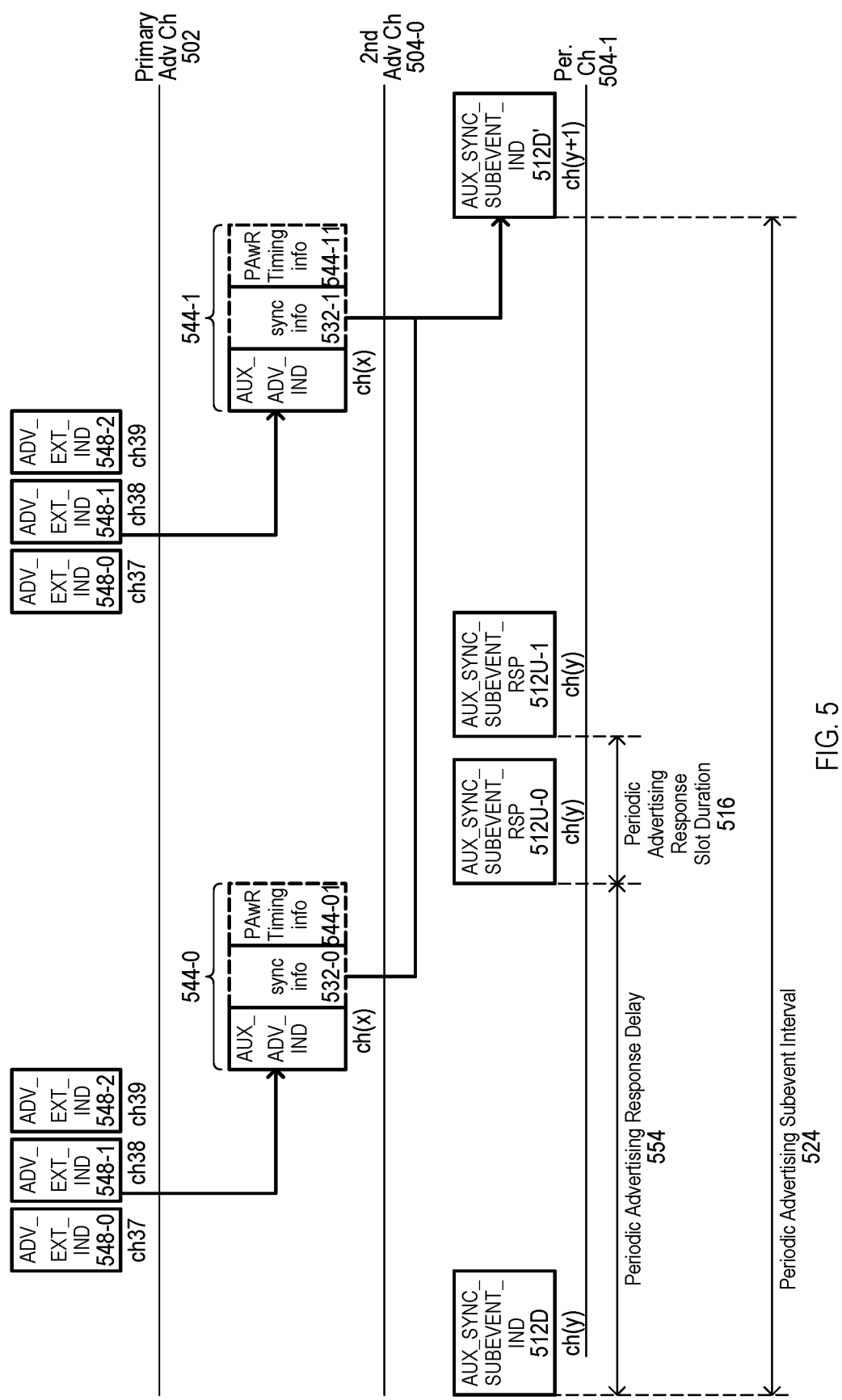
FIG. 5 is a timing diagram showing synchronization operations according to another embodiment.

FIG. 5 shows operations of a scanning device and a periodic advertiser (e.g., broadcaster) according to another embodiment. FIG. 5 shows items like those of FIG. 2, but with a leading digit being a "5" instead of a "2".

FIG. 5 shows transmissions by an advertising device on primary advertising channels 502, one or more secondary advertising channels 504-0 and one or more other channels 504-1. Primary advertising channels 502 can be channels designated by a standard for broadcast data. Secondary advertising channels 504-0 can be channels identified by advertising packets (548-0 to -2) on the primary advertising channel 502. Other channels 504-1 can be secondary advertising channels or other channels that carry a train of synchronized packets.

Referring still to FIG. 5, a train of synchronized packets can include sub-intervals (one shown as 524). Each sub-interval 524 can include a window for broadcast packets 512D, and following a response delay 554, one or more windows for response packets 512U-0/1 (i.e., for packets transmitted by a scanning device).

Packets with extended sync info 544-0/1 can be dynamically timed for periods of time when transmissions are not expected for the advertising link (i.e., idle times). In the embodiment shown, a packet with extended synch info 544-0 can be transmitted by a broadcaster (and thus received by a synchronizer) after a first broadcast (e.g., download) window 512D but before a corresponding first response (e.g., upload) window 512U-0. In addition or alternatively, a packet with extended synch info 544-1 can be transmitted by a broadcaster after a last response window of the sub-interval 524, but before a first broadcast window 512D' of a next ad interval.

In a BT PAwR-type embodiment, primary advertising channels can be channels 37, 38 and 39 according to a BLE standard, and such packets can include ADV_EXT_IND PDUs. Packets with extended synch info 544-0/1 can include AUX_ADV_IND PDUs. In some embodiments, such packets can include Synch Info 532-0 which can identify a start of each train of advertising packets and extended synch info 544-01/11 that can identify a sub-event (e.g., a sub-event number), as described herein or equivalents.

In this way, the timing for packets with extended synch info that enables rapid synchronization can dynamically adapt to channel use. Further, packets with extended synch info can be transmitted on a channel other than that which carries the periodic train of synchronized packets.

FIG. 6A shows a conventional periodic advertising operation. An advertising device can transmit advertising packets with ADV_EXT_IND PDUs on primary BLE advertising channels 37, 38 and 39. A scanning device can receive an advertising packet (e.g., 649-2), and from such a packet identify secondary advertising channel 603. A scanning device can scan secondary advertising channel 603 to detect packet 651. Packet 651 can include an AUX_ADV_IND PDU with synch info for a periodic advertising link on channel 605, that transmits periodic advertising packets 613 in ad intervals 607.

Figure 6B:
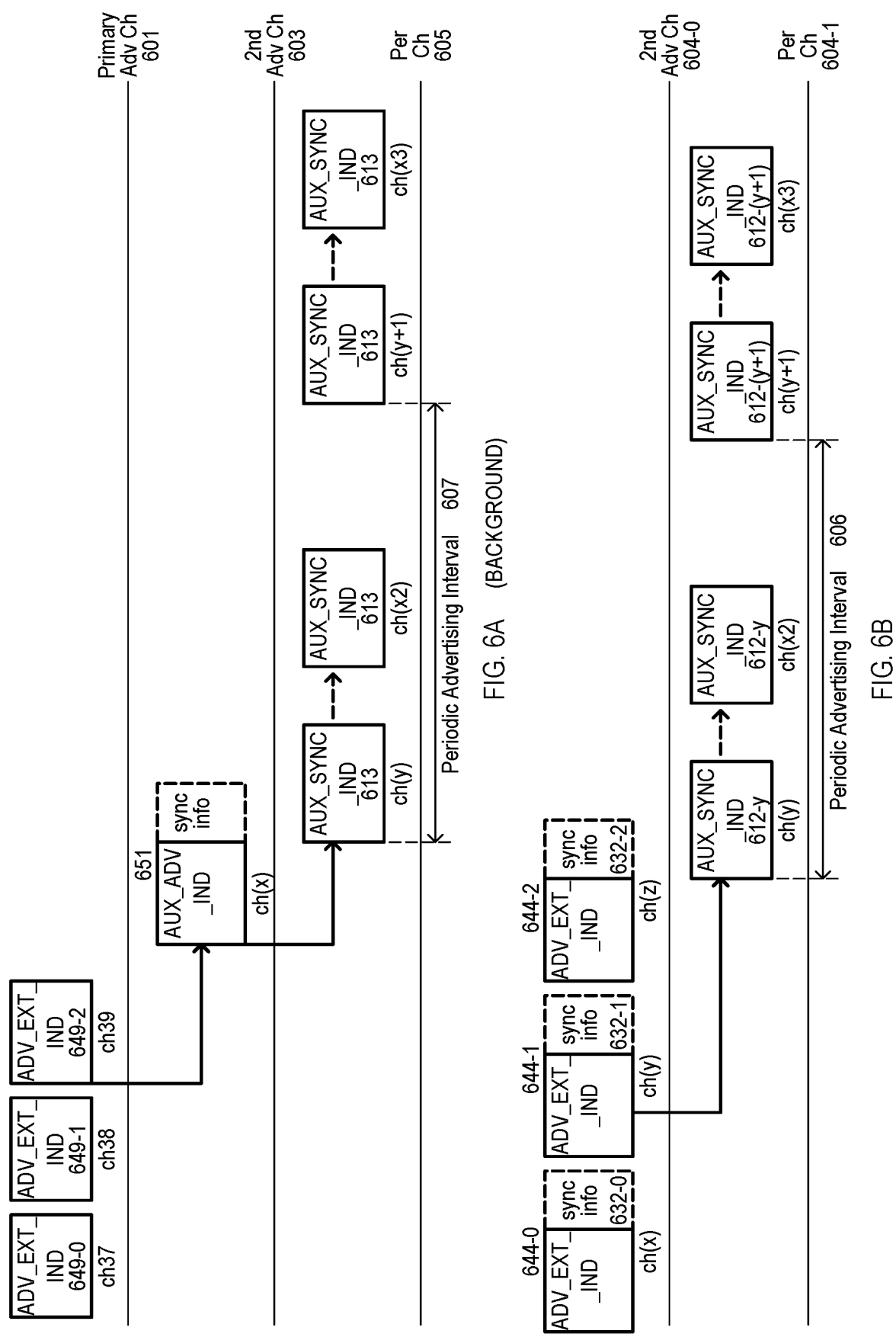

FIG. 6B shows a periodic advertising operation according to another embodiment. In contrast to the conventional operation of FIG. 6A, a periodic advertising operation can transmit multiple advertising info packets (644-0 to -2) with synch info (623-0 to -2) on a secondary channel 604-0, which is not a channel designated by a standard as an advertising channel. In some embodiments, advertising packets (644-0 to -2) can provide synchronization info for packet trains on different channels. In FIG. 6B, advertising packets 644-0, -1 and -2 can provide synch info for advertising links on channels x, y and z, which can be non-primary advertising channels. FIG. 6B shows the advertising link on channel y, which can include a train of packets 612-$y$ for an ad interval and packets 612-($y$+1) for a following ad interval.

In a BT PAwR-like embodiment, advertising packets with synch info 644-0 to -2 can include ADV_EXT_IND PDUS.

In this way, advertising packets with synch info for one or more advertising links can be provided on a secondary advertising channel.

In some embodiments, a scanning device can transmit an acknowledgement after receiving an advertising packet with extended synch info. Such an acknowledgement can be timed to not interfere with other transmission windows of the ad interval.

Figure 7:
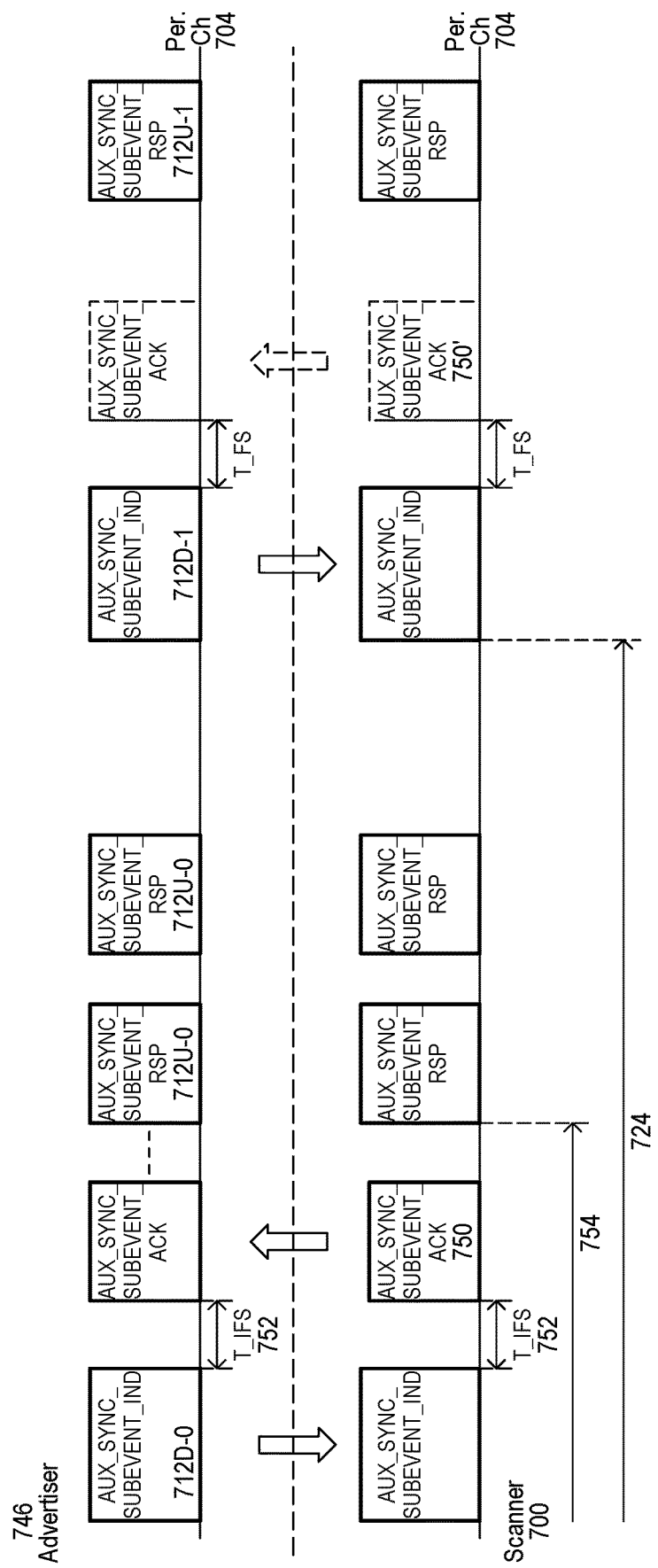
FIG. 7 is a timing diagram showing synchronization acknowledgement operations according to an embodiment.

FIG. 7 is a timing diagram showing operations of an advertising device 746 and scanning device 700 according to an embodiment. An advertising device 746 can establish an advertising link on a channel 704 with repeating sub-intervals 724 in an ad interval. Sub-intervals 724 can include download windows in which an advertising device can transmit broadcast packets 712D-0/1 as well as upload windows 712U-0/1 in which a scanning device 700 can transmit packets for receipt by an advertising device 746. In the embodiment shown, there can be a response delay 754 between a download window and corresponding upload window(s).

According to embodiments, upon receiving a download packet 712D-0/1 a scanning device 700 can transmit an acknowledgement packet 750. An acknowledgment packet 750 can be timed between expected download and upload windows. In the embodiment shown, an acknowledgment packet 750 can be transmitted a delay T_IFS 752 after receiving an advertising packet. In some embodiments, a delay T_IFS 752 can be a minimum spacing according to a standard. A delay T_IFS 750 and size of acknowledgment packet 750 can be selected to fit within a response delay 754.

In some embodiments, upon receiving an acknowledgement packet 750, an advertising device 746 can transmit periodic advertising data for the scanning device 700 in next appropriate download window. In some embodiments, if a scanning device 700 does not receive a desired packet following an acknowledgement packet, it can execute a "backoff" operation to determine when to re-transmit an acknowledgement packet. Such a backoff operation can take any suitable form, including but not limited to: transmitting within a random sub-interval (e.g., within a response period of such an interval) or waiting until a next anchor point and corresponding sub-interval.

In a BT PAwR-type embodiment, operations like those of FIG. 7 can enable a synchronizer to acquire synchronization at an earliest point without any feedback to the advertiser. In certain use cases, where an ad interval is relatively large, it would be beneficial to inform advertiser that a synchronizer is active and acquired sync. A synchronizer, after acquiring synch, can send a short ACK PDU after T_IFS time transmitting SYNC_SUBEVENT_IND. A broadcaster can then open a receive window to receive the ACK (AUX_SYNC_SUBEVENT_ACK) transmission from a synchronized receiver.

Upon receiving active info, a broadcaster can inform a synchronized receiver via a sub-event transmission, which can include "active info". This can complete a handshake. In some embodiments, an application can choose to send application specific command in a subsequent subevent to inform a synchronized receiver of its position in the network and start serving the node (i.e., synchronized receiver). In such an arrangement, multiple sync receivers can attempt to send an ACK which can result in a collision. Any missed confirmation from broadcaster can allow a synchronized receiver to run back off algorithm and retry sending active info, as described herein.

In this way, in response to receiving a broadcast packet in a sub-interval, a scanning device can return an acknowledgement packet in a time period not designated to transmitting or receiving packets.

Figure 8:
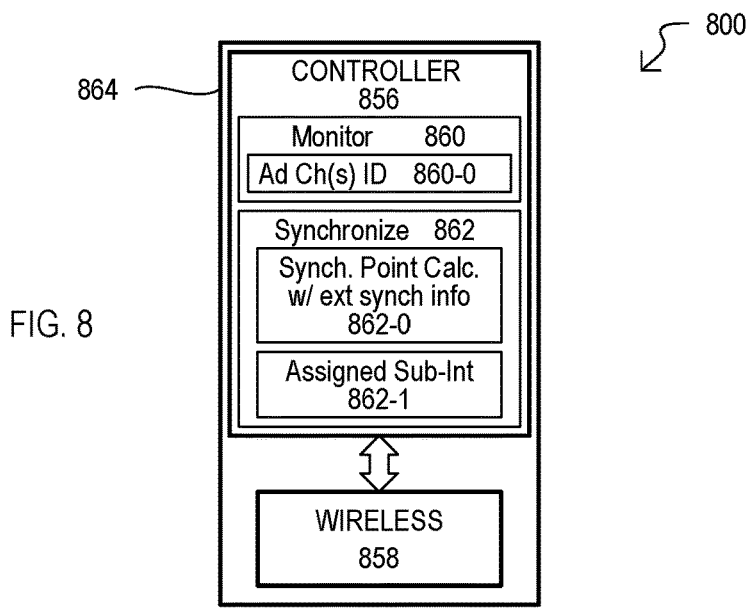
FIG. 8 is a block diagram of a wireless device according to an embodiment.

While embodiments can include various operations and methods described herein, embodiments can also include devices that execute such methods and operations. FIG. 8 is a block diagram of a scanning device 800 according to an embodiment. A device 800 can include a controller section 856 and wireless circuits 858. A controller section 856 can execute functions for scanning devices as described herein, and equivalents, and can be composed of any suitable circuits, including but not limited to: one or more processors with corresponding instructions, custom logic and/or programmable logic.

A controller section 856 can include channel monitoring circuits 860 and synchronizing circuits 862. Monitoring circuits 860 can monitor one or more channels identified by channel data 860-0 for packets that include synch info. Such monitoring can be for periods of time less than a full ad interval, as described herein or equivalents. Synch info can include extended synch info, which can enable determination of individual sub-intervals within an ad interval, as described herein and equivalents. Channel data 860-0 can identify channels that are not primary advertising channels on which extended sync info can be acquired.

Synchronizing circuits 862 can determine timing for one or more advertising links based on synch info. Such an action can include calculating a synchronization point in time with extended synch info 862-0. Such an action can also include determining one or more assigned sub-intervals 862-1. Assigned sub-intervals can be windows within repeating ad intervals during which data for the scanning device can be expected to be broadcast and/or windows during which a scanning device can transmit data for reception by an advertising device.

Wireless circuits 858 can enable communication according to one or more wireless standards, including but not limited to one or more BT standards.

In some embodiments a device 830 can be formed with a same integrated circuit substrate 864.

In this way, a wireless device can monitor for any of multiple packets in a same ad interval that include synch info to enable synchronization with one or more periodic advertising links.

Figure 9:
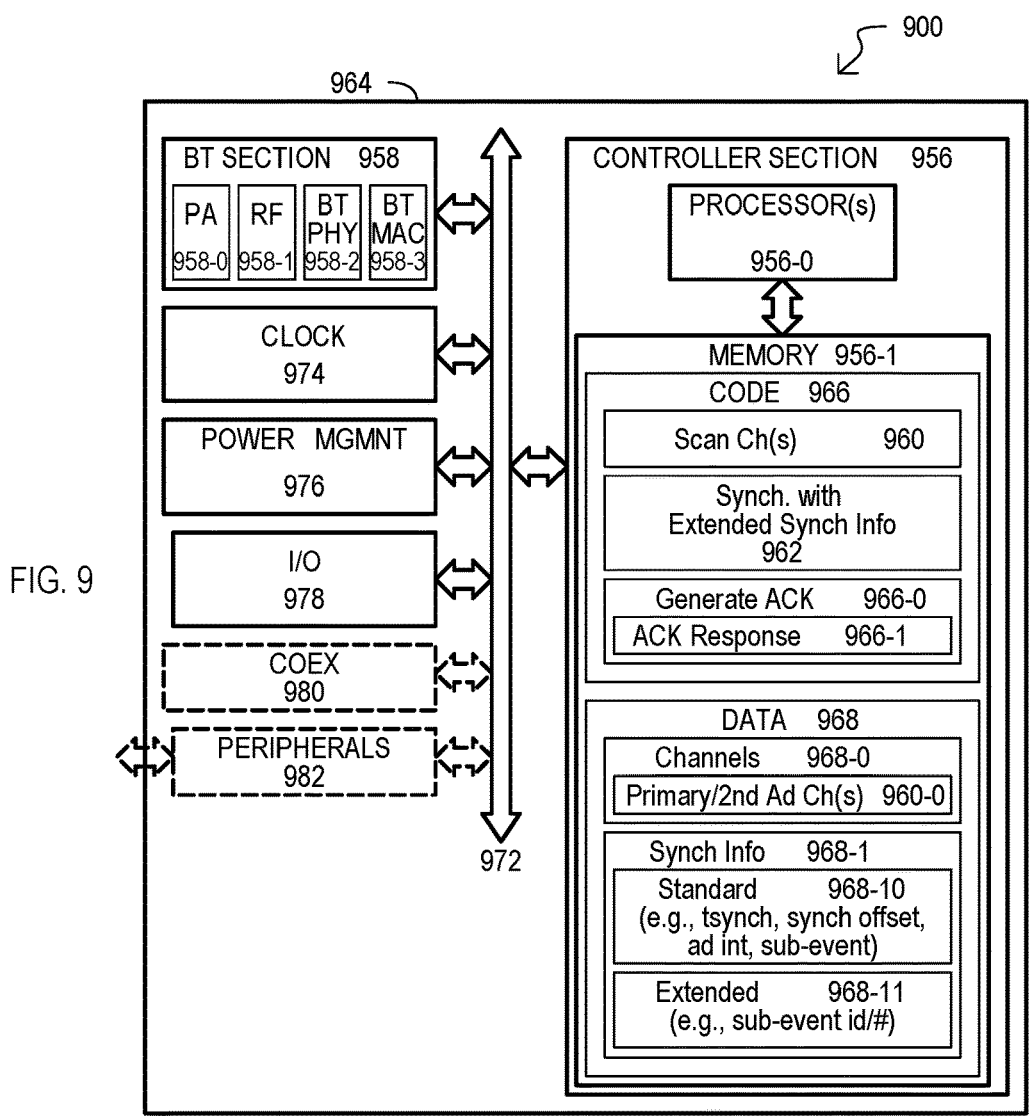
FIG. 9 is a block schematic diagram of a scanning device according to another embodiment.

FIG. 9 is a block diagram of a scanning device 900 according to another embodiment. A device 900 can be an integrated circuit (IC) device configured to provide BT communications. A device 930 can include a controller section 956, a BT section 958, clock circuits 974, power management circuits 976 and input/output (I/O) circuits 978 in communication with one another over a bus system 972. Controller section 956 can include processors 956-0 and a memory sub-system 956-1. Processors 956-0 can include one or more processor circuits configured to execute code to provide various functions.

Memory sub-system 956-1 can include code 966 and data 968. Code 966 can be executed by processors 956-0, and can include channel scan code 966, synchronizing code 962 and acknowledgement (ACK) code 966-0. Channel scan code 966 can scan channels for packets with synchronization data, where such channels are not BT primary advertising channels, as described herein. Synchronizing code 962 can enable device 900 to synchronize with one or more advertising links using extended synch info. Extended synch info can enable synchronization with an advertising link from any of a number of packets transmitted in a same ad interval, as described herein and equivalents. ACK code 966-0 can generate ACKs to broadcast packets in time periods not dedicated to broadcast packets, as described herein and equivalents.

Data 968 can store any data suitable for operating as a scanning device, including but not limited to channel data 968-0 and synch info 968-1. Channel data 968-0 can include channels used for synchronizing to advertising links as described herein and equivalents, including primary advertising channels, secondary advertising channels and other channels that may carry a periodic advertising link. Synch info 968-1 can include standard sync info 968-10 and extended synch info 968-11. Standard synch info 968-10 can be that expected from a BT standard. In some embodiments, this can include but is not limited to, a $t_{sync}$ value, synch offset value, ad interval value, sub-event value and any other suitable anchor point value(s). Extended synch info 968-11 can include information that goes beyond a current BT standard, and can include a sub-event identifier (i.e., count) that can be included in each sub-event indication of an ad interval.

In some embodiments, the various circuits of device 900 can be formed with a same IC substrate 964.

A BT section 958 can include circuits for communications compatible with BT standards. A BT section 958 can include power amplifier circuits 958-0, RF circuits 958-1, BT physical layer (PHY) circuits 958-2 and BT MAC layer circuits 958-3.

A clock circuit 974 can control timing for a device and can be used to maintain synchronization with advertising channels. Power management circuits 976 can control power to a device 900. In some embodiments, power management circuits 976 can place a device 900 into a lower power mode during non-assigned sub-events once a device 900 has synchronized with an advertising link. I/O circuits 978 can provide an interface for other devices to communicate and/or control device 900. In some embodiments, I/O circuits 978 can provide an interface suitable with one or more serial communication standards, including but not limited to SPI, I2C or USB.

Optionally, a device 900 can include coexistence circuits 980 which can enable coordination of BT operations with another wireless standard, such as an IEEE 802.11 wireless standard (e.g., WiFi), as but one example. Optionally, a device 900 can include peripheral related circuits 966 which can include circuits that can provide a number of additional functions related to applications, including but not limited to: analog circuits (e.g., ADCs, DACs), modulation circuits (e.g., PWM, PCM, sigma-delta), audio circuits (microphones, speakers), display driver circuits or sensor circuits.

In this way, a device can synchronize with a BT periodic advertising link by extracting extended sync info from any of multiple packets transmitted during a same ad interval.

Figure 10:
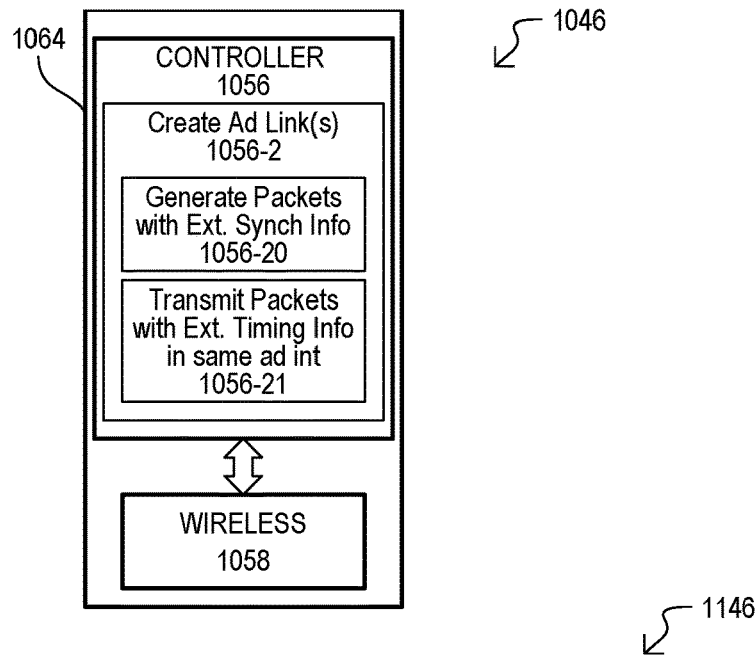
FIG. 10 is a block diagram of an advertiser device according to a further embodiment.

FIG. 10 is a block diagram of an advertising device 1046 according to an embodiment. A device 1046 can include a controller section 1056 and wireless circuits 1058. A controller section 1058 can execute functions for advertising devices as described herein, and equivalents, and can be composed of any suitable circuits, including but not limited to: one or more processors with corresponding instructions, custom logic and/or programmable logic. A controller section 1056 can include circuits for creating advertising links 1056-2 as described herein, and equivalents. Such circuits can generate packets with extended synch info 1056-20. Such packets can be transmitted in a same ad interval 1056-21, as described herein and equivalents.

Wireless circuits 1058 can enable communication according to one or more wireless standards, including but not limited to one or more BT standards.

In some embodiments a device 1030 can be formed with a same integrated circuit substrate 1064.

In this way, a wireless device can transmit multiple packets within a same ad interval that include extended synchronization data or enabling scanning devices to synchronize with a corresponding periodic advertising link.

Figure 11:
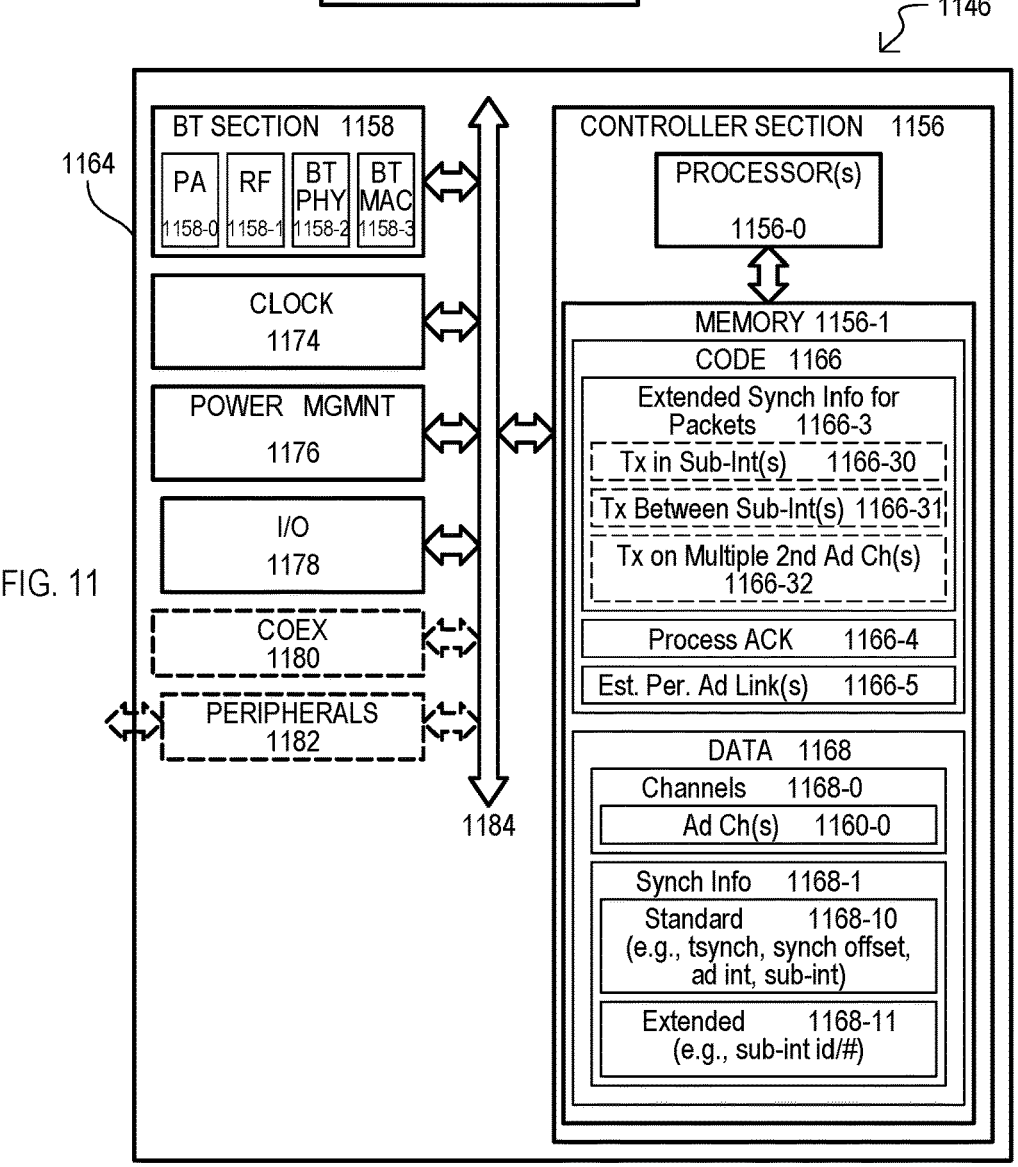
FIG. 11 is a block schematic diagram of an advertiser device according to a further embodiment.

FIG. 11 is a block diagram of an advertising device 1146 according to another embodiment. A device 1146 can include items like those of FIG. 9. Such like items are referred to by the same reference character but with the first digits being "11" instead of a "9".

A device 1146 can differ from that of FIG. 9 in that a controller section 1156 can include circuits for generating and transmitting packets with extended synch info 1166-3. Such circuits can transmit packets according to any of the embodiments herein, including but not limited to: transmitting on multiple (including all) sub-events of a same ad interval 1166-30; transmitting between sub-events (both statically and dynamically) 1166-31; and transmitting on multiple secondary advertising channels 1166-32. A device 1146 can also include ACK processing code 1166-44, which can process ACKs received from scanning device. In some embodiments, this can include responding to ACKs. Such a response can provide further synchronization data for a scanning device. Code 1166 can also establish one or more advertising links 1166-5 corresponding to the extended synch information packets.

In this way, a device can include circuits for establishing a BLE periodic advertising link, and then transmitting packets with extended synchronization data that enable a scanning device to synchronize with the advertising links without having to scan over one or more full ad intervals.

Figure 12:
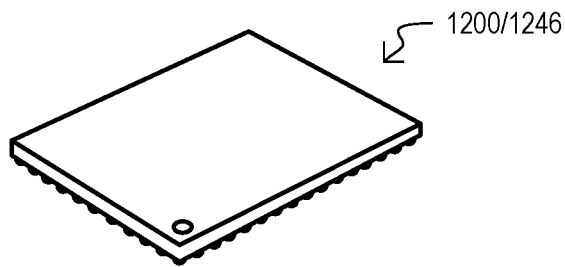
FIG. 12 is a diagram of an integrated circuit device according to an embodiment.

While embodiments can include devices with various interconnected components, embodiments can have a unitary structure which can enable the update of communication parameters via a synchronized advertising link as described herein and equivalents. Such unitary devices can be advantageously compact single integrated circuit (IC) devices. FIG. 12 shows one particular example of a device 1200/1246 formed in a single IC package. A device 1200/1246 can be a scanning device or an advertising device as described herein. In some embodiments, a device 1200/1246 can include a single die in the package. However, it is understood that a combination device according to embodiments can include any other suitable integrated circuit packaging type, as well as direct bonding of a combination device die onto a circuit board or substrate.

While embodiments can include any of the method described herein with reference to the various devices and systems, additional methods will now be described with reference to flow diagrams. It is understood that all, or portions of the described methods can be combined with one another.

Figure 13:
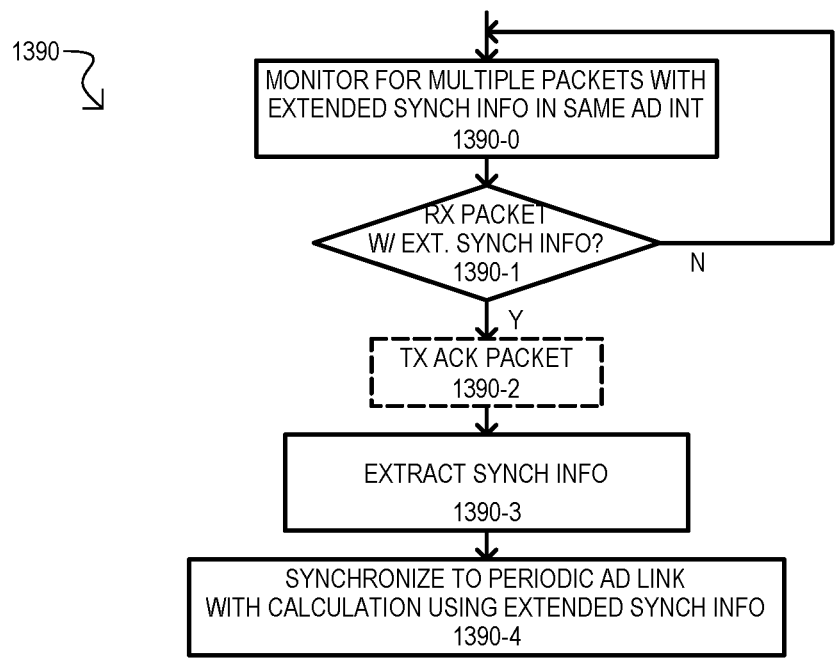
FIG. 13 is a flow diagram of a method according to an embodiment.

FIG. 13 is a flow diagram of a method 1390 according to an embodiment. A method 1390 can be executed by a scanning device. A method 1390 can include monitoring one or more advertising packets with extended synch info in the same advertising interval 1390-0. Such an action can include scanning for packets on a non-primary advertising channel at any point in an ad interval (without knowing when the ad interval starts or stops). A method 1390 can determine if a received packet contains extended synch info 1390-1. Such an action can include examining one or more predetermined fields of the packet. If a packet with extended synch info is not received (N from 1390-1) a method 1390 can continue to scan for packets. This is in contrast to conventional approaches which can scan a primary advertising channel for a packet timed once per ad interval.

If a packet with extended synch info is received (Y from 1390-1), optionally, a method 1390 can return an acknowledgement packet 1390-2. Such an action can include transmitting an ACK packet a minimum time after receiving a packet with extended synch data and/or during periods of an ad interval outside of established receive or respond windows. A method 1390 can extract synch info from the packet 1390-3, which can include extended synch info. A method 1390 can then synchronize to a periodic advertising link with a calculation that uses the extended synch info. As noted for embodiments herein, such actions can enable a device to immediately begin synchronizing with an advertising link. In some embodiments, extended synch info can include identifying a position (e.g., sub-interval or sub-event number) within the ad interval, from which a start of the ad interval can be determined.

In this way, a device can synchronize to a periodic advertising link with extended synch info included in any of a number of packets transmitted during an ad interval.

Figure 14:
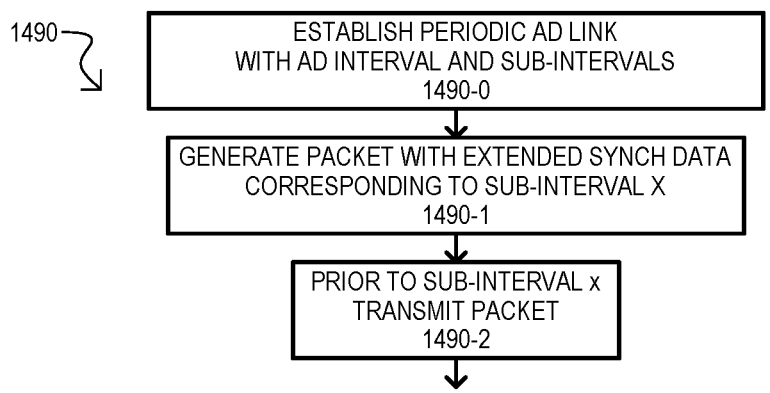
FIG. 14 is a flow diagram of a method according to a further embodiment.

FIG. 14 is a flow diagram of a method 1490 according to another embodiment. A method 1490 can be executed by an advertising device and can include establishing a periodic advertising link with a repeating ad interval with sub-intervals 1490-0. Such an action can include transmitting broadcast packets periodically on one or more channels.

A method 1490 can generate a packet with extended synch info corresponding to the sub-interval 1490-1. Prior to the sub-interval, the packet can be transmitted 1490-2. In some embodiments, such an action can include transmitting the packet after a previous (i.e., x−1) sub-interval. In some embodiments a packet with extended synch info can be transmitted on the same channel as the advertising link. In other embodiments, such a packet can be transmitted on a different channel.

In this way, a synch info packet can be transmitted prior to a packet in a periodic train of packets. With synch info, a receiving device can determine the subsequent packet's position in the train and thus synchronize to the train.

Figure 15:
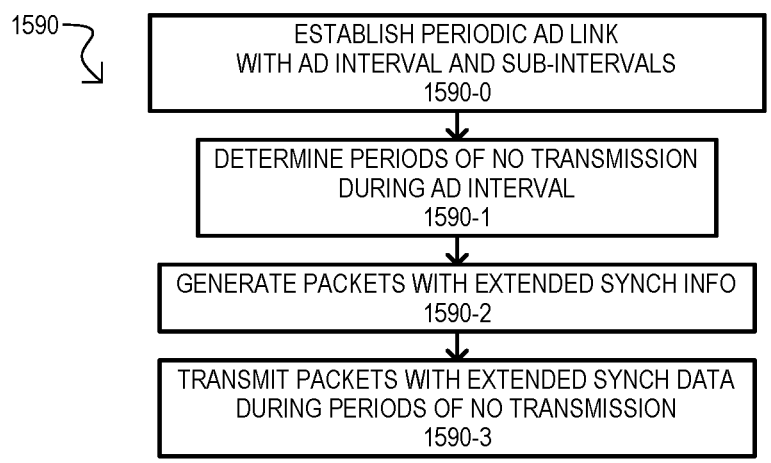
FIG. 15 is a flow diagram of a method according to another embodiment.

FIG. 15 is a flow diagram of a method 1590 according to another embodiment. A method 1590 can be executed by an advertising device and can include establishing a periodic advertising link with a repeating ad interval with sub-intervals 1590-0. A method 1590 can determine period of time when there are no transmissions during the ad interval 1590-1. Such an action can include determining time periods between transmission (e.g., download) windows and reception (e.g., upload) windows. As but two of many possible examples, such no transmission time periods can be after a transmission window but before its corresponding upload window(s).

A method 1590 can generate packets with extended synch info 1590-2. Such packets can include timing data to enable synchronization with an advertising channel as described herein or equivalents. Such packets can then be transmitted during the time periods of no transmission 1590-3.

In some embodiments, a method 1590 can be executed periodically, enabling the periods during which packets with extended synch info are transmitted to change with changes in the ad interval timing.

In this way packets with extended synch info can be transmitted during non-transmission time periods of an advertising link.

Figure 16:
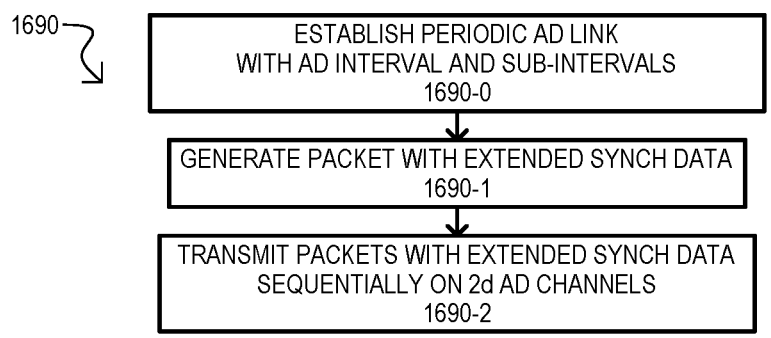
FIG. 16 is a flow diagram of a method according to another embodiment.

FIG. 16 is a flow diagram of a method 1690 according to another embodiment. A method 1690 can be executed by an advertising device and can include establishing a periodic advertising link with a repeating ad interval with sub-intervals 1690-0. A method 1690 can generate packets with extended synch info 1690-1. Such packets can then be transmitted sequentially on secondary ad channels 1690-2.

In this way packets with extended synch info can be transmitted on secondary ad channels.

Figure 17:
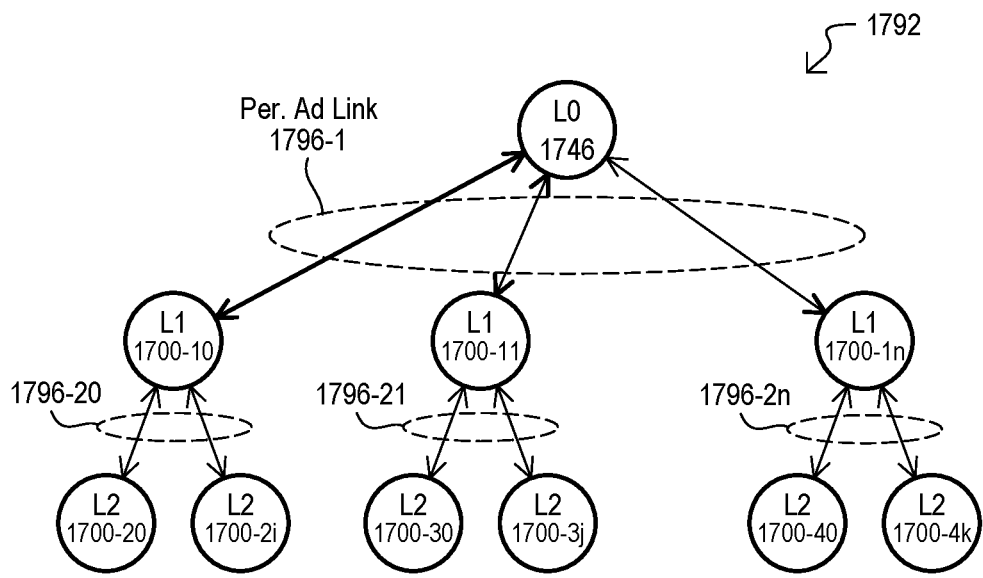
FIG. 17 is a diagram of a multi-layered system according to an embodiment.

FIG. 17 is a diagram showing a system 1792 according to an embodiment. A system 1792 can be a multi-layered network that includes a root or "data aggregation" node L0 1746, a number of first level nodes L1 (1700-10 to 1700-1*n*) and second level nodes L2 (1700-20 to -4*k*). Root node L0 and first level nodes L1 can be in communication by a first periodic advertising link 1796-1. First level nodes L1 can each be in communication with second level nodes L2 via a corresponding second periodic advertising links 1792-20 to -2*n*. Thus, first level nodes L1 can operate as advertising devices and scanning devices.

Root node L0 can transmit packets with extended synch info to enable first level nodes L1 to rapidly synchronize with advertising link 1796-1. Similarly, first level nodes L1 can transmit packets with extended synch info to enable second level nodes L2 to synchronize with their corresponding advertising links 1796-20 to -2*n*.

In some applications, it is desirable to align second advertising links 1796-20 to -2*n* with first advertising link 1796-1. For example, proper alignment can result in a faster transmission of data throughout the system 1792 (e.g., propagation of data from root node to lower level nodes of the system).

By providing packets with extended synch info as described for the various embodiments herein, L1 nodes (1700-10 to 1700-1*n*) can rapidly synchronize with first advertising link 1796-1 and enable L2 nodes (1700-20 to 1700-4*k*) to rapidly synchronize with L1 nodes (1700-10 to 1700-1*n*). Thus, an entire system can be synchronized.

Figure 18:
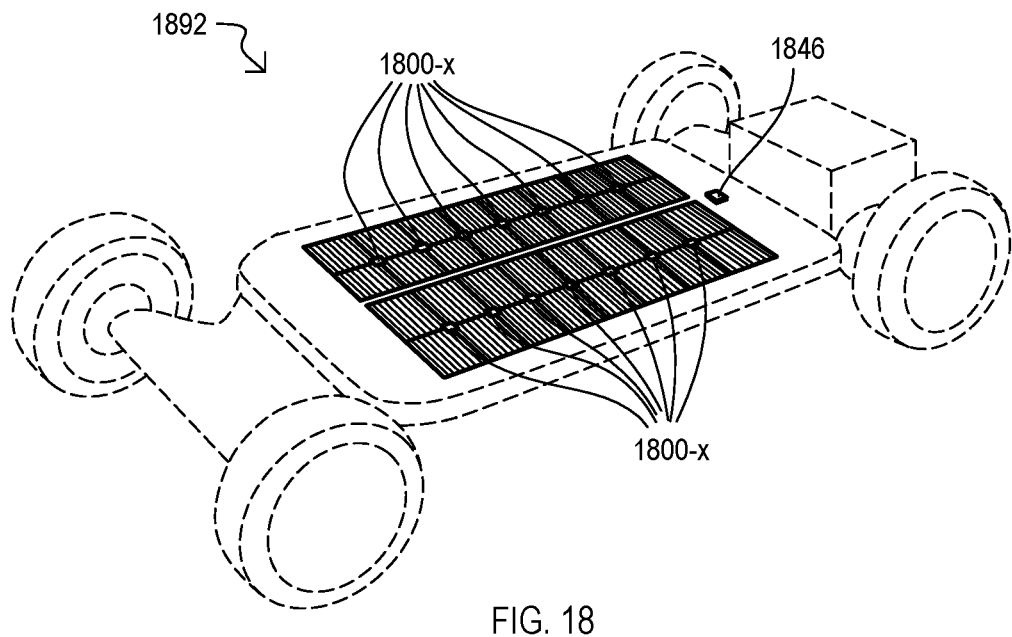
FIG. 18 is a diagram of a wireless battery management system according to an embodiment.

FIG. 18 is a diagram of a wireless battery management system (WBMS) 1892 according to an embodiment. A WBMS 1892 can include a root node 1846 and a plurality of monitor nodes 1800-*x* which can be arranged into two or more levels in communication with one another via advertising links that enable fast synchronization as described herein or equivalents.

If conventional BT PAwR advertising links are used for communications in a WBMS system like that of FIG. 18, synchronization of all nodes can take 200 to 300 ms, as the large number of nodes must each scan up to an entire ad interval to start acquiring synchronization data on a primary advertising channel, and then scan crowded secondary advertising channels for synch info. Such a delay can be unacceptable in automobile applications, which can require network establishment within 100 ms.

However, a system 1892 can include BT PAwR type communications but with packets that include extended synchronization data, as described for embodiments herein. As a result, synchronization times can be about 50 ms, well within a 100 ms requirement. This can include different links of a system synchronizing on their own, and then aligning with higher levels as described with reference to FIG. 17.

In this way, a WMBS can include the transmission of packets with extended synch data for rapid synchronization in automobile applications.

Figure 19:
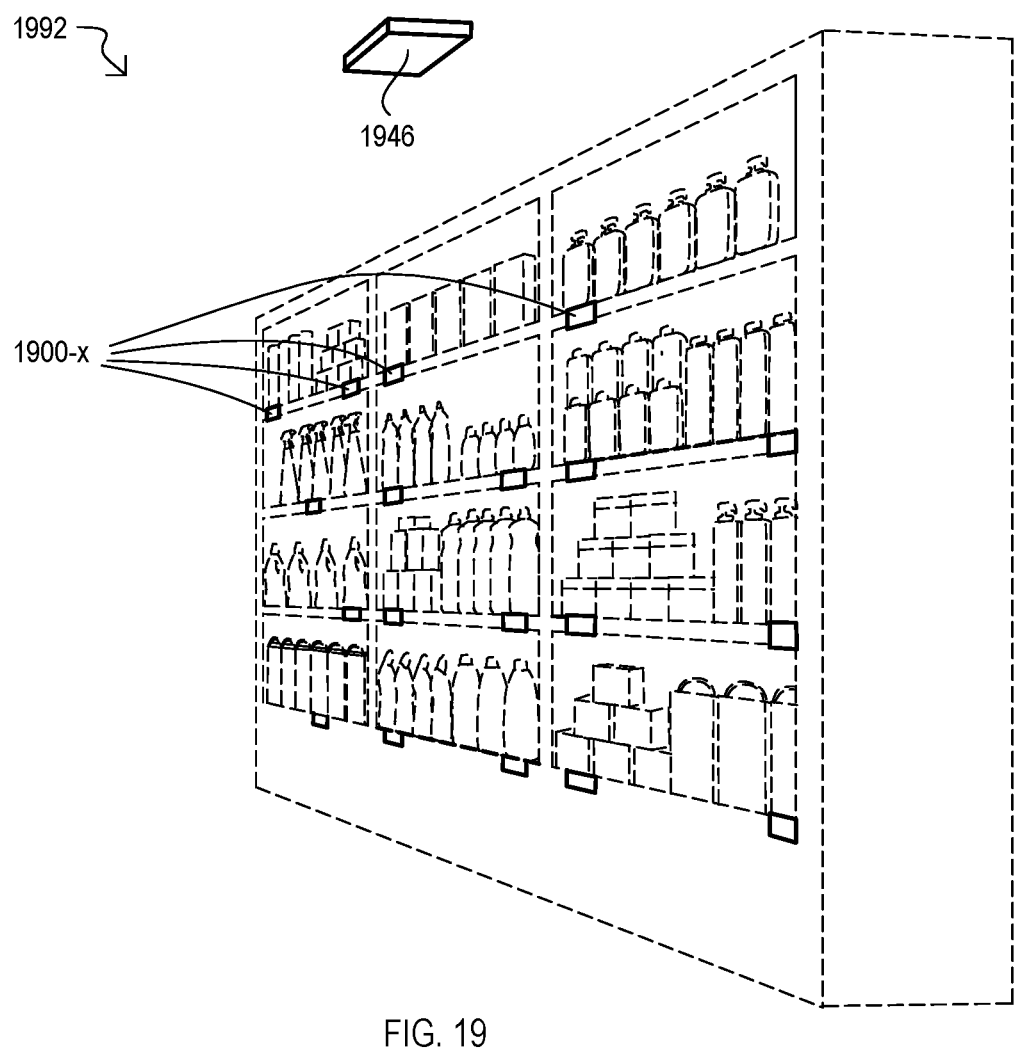
FIG. 19 is a diagram of an electronic shelf system according to an embodiment.

FIG. 19 is a diagram of an electronic shelf label (ESL) system 1992 according to an embodiment. A system 1992 can include a management node 1946 and a number of lower level nodes (four shown as 1900-*x*). In some embodiments, lower level nodes 1900-*x* can provide display information that can be periodically updated by communications from a management node 1900-0 via one or more periodic advertising links. Alternatively, nodes 1900-*x* can be stations that transmit data to electronic labels.

According to embodiments, lower level nodes 1900-*x* can operate as nodes in a system like that of FIG. 17. Thus, synchronization between all nodes can occur rapidly and/or will less power. In this way, data for ESL labels can be updated faster than conventional systems.

While embodiments can enable devices to quickly synchronize to advertising links, embodiments can also improve synchronization times when operating in conjunction with a host device.

Figure 20A:
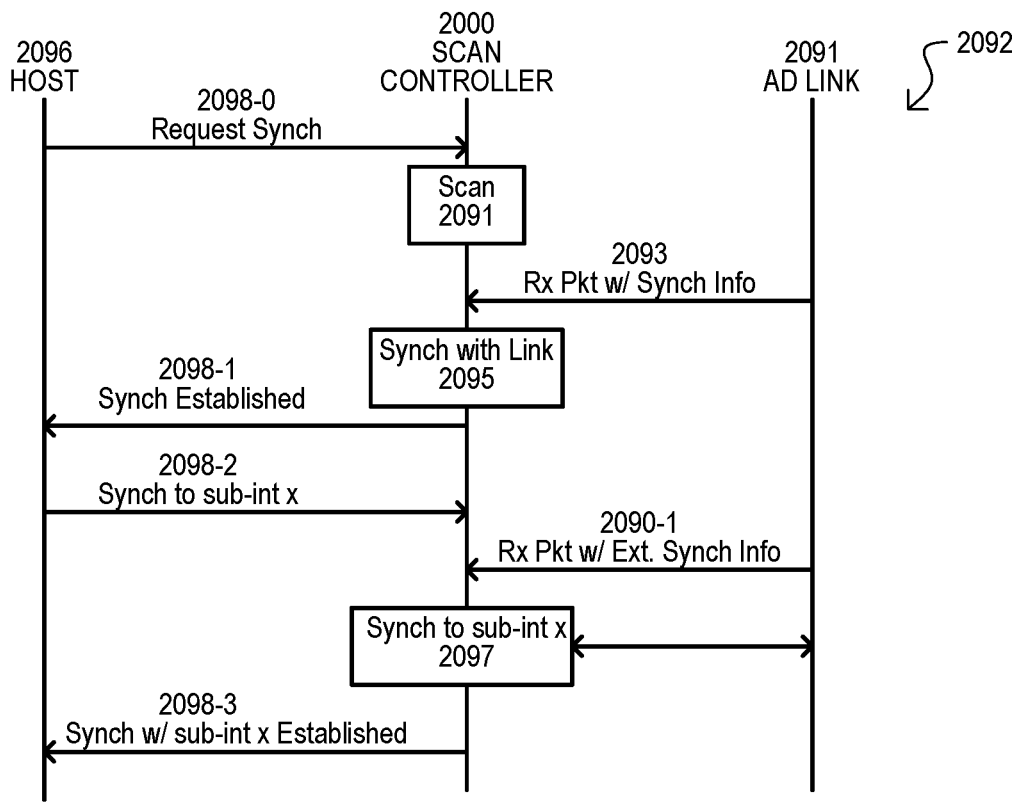
FIGS. 20A and 20B are signaling diagrams according to embodiments.

FIG. 20A is a signaling diagram of a system 2092 that includes a host device 2096 and scanning device (e.g., controller) 2000. A host device 2096 can make a request 2098-0 to a controller to synchronize to an advertising link 2003. In response, a controller 2000 can scan for packets 2091 that include synch info. With such information, controller 2000 can synchronize 2095 with the ad link (e.g., determine the starting point for the first window in a train of windows).

Once synchronized, controller 2000 can send a notification 2098-1 that it is synchronized. Such a notification can also include information about the advertising link. A host 2096 can send a message to controller 2000 that identifies a particular sub-interval (sub-int x) for synchronization. However, If sufficient time has passed, a controller 2000 may have to execute a rapid synchronization operation, as described herein, and receive a packet with extended synch info 2090-1. From such information, a controller 2000 can synchronize to the desired sub-interval 2097. A controller 2000 can then indicate to host 2096 it is synchronized to an indicated sub-interval 2093-3. A controller 2000 can service host with data broadcast over the sub-interval.

As shown, a synchronization operation in FIG. 20A may result in two receive operations 2093 and 2090-1.

Figure 20B:
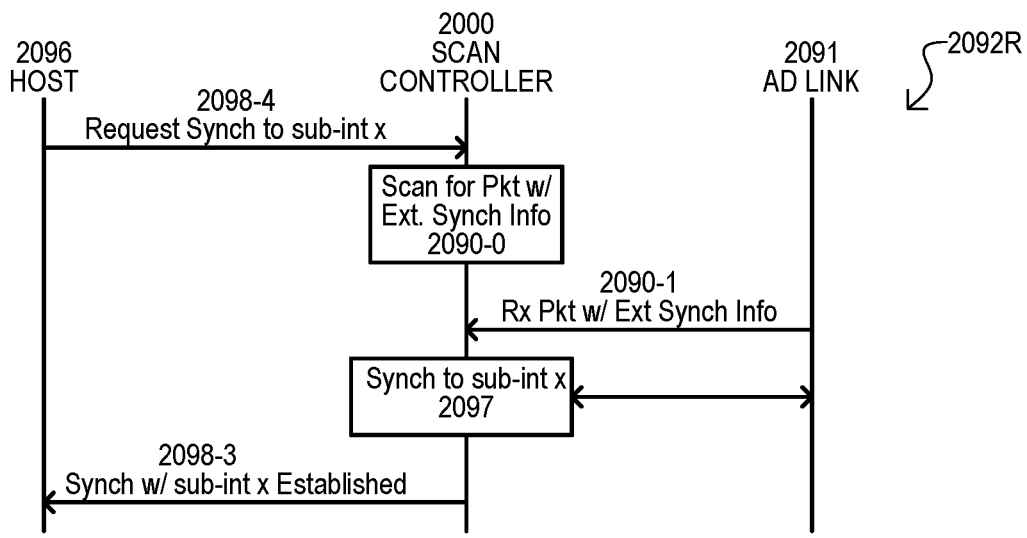

FIG. 20B is a signaling diagram of a system 2092R like that of FIG. 20A. However, when a host device 2096 issues a request for synchronization to a controller 2000, the host 2096 it can identify a sub-interval 2098-4. As a result, a controller 2000 can scan for a packet with extended synch info 2090-0 as described for embodiments herein, or equivalents.

Upon receiving a packet with extended synch info 2090-1, a controller 2000 can synchronize to the desired sub-interval 2097, as described herein. A controller 2000 can then notify and service host 2096 as described for FIG. 20A.

In this way, a scanning device can have a predetermined indication of a desired sub-interval for faster synchronization with the sub-interval.

According to embodiments systems can enable faster acquisition of data streams provided via periodic advertising links. In particular, acquisitions can be much faster than waiting for an advertising event that occurs once per ad interval.

According to embodiments systems can reduce power consumption as synchronization can be achieved quicker and/or a device can transition to a lower power mode faster once synchronized.

According to embodiments, packets with synch info can be moved to channels and/or time periods not typically used for such data. This can result in better utilization of over-the-air bandwidth. Packet error rate can be improved as collisions can be reduced. Further, traffic on primary advertising channels can be reduced over conventional approaches.

Systems with fast acquisition of advertising link, as described for embodiments herein, confirmation of synchronization can be provided quicker to a host. This can enable a host to start a corresponding application faster, for better performance. Further, such fast acquisition of synchronization can enable a host application to get into a steady state faster than conventional approaches, which can result in overall lower power consumption According to embodiments, a scanning device (e.g., synchronized receiver) can know a sub-interval (e.g., sub-event) number prior to synchronization. Using extended synch info, a scanning device can synchronize directly to a sub-interval, in contrast to conventional approaches that require multiple steps and overall longer acquisition times.

Embodiments can allow greater flexibility in advertising channel selection as compared to conventional approaches. In some embodiments, systems can deduce which secondary (i.e., non-primary advertising) channels a least congested or otherwise more suitable for broadcasting synch info.

Embodiments are directed to methods, devices and systems that include, by operation of a wireless device configured to operate according to at least one wireless standard that includes primary advertising channels: monitoring at least one non-primary advertising channel for packets; determining if any of the packets received during a same periodic advertising interval of a periodic advertising link include synchronization data; in response to acquiring a packet with synchronization data, extracting synchronization data from the packet with synchronization data; and synchronizing to the periodic advertising link with the synchronization data to determine timing for at least one download window in each periodic advertising interval. The periodic advertising interval can include a plurality of periodic sub-intervals and the at least one download window corresponds to at least one of the sub-intervals.

Embodiments are directed to methods, devices and systems that include wireless circuits configured to transmit and receive packets over a plurality of channels according to at least one wireless standard, monitor the at least one non-primary advertising channel for packets, determine if any packets received during a same periodic advertising interval of a periodic advertising link include synchronization data, and synchronize to the periodic advertising link with the synchronization data to determine timing for at least one download window in each periodic advertising interval. Controller circuits can be included that are configured to, in response to acquiring a packet with synchronization data, extract the synchronization data. The periodic advertising interval includes a plurality of periodic sub-intervals and the at least one download window corresponds to at least one of the sub-intervals. The wireless standard includes primary advertising channels that are assigned to broadcast transmissions.

Embodiments are directed to methods, devices and systems include that a scanning device configured to transmit and receive packets over a plurality of channels according to at least one wireless standard, monitor at least one non-primary advertising channel for packets, determine if any of the packets received during a same periodic advertising interval of a periodic advertising link include synchronization data, and synchronize to the periodic advertising link with the synchronization data to determine timing for at least one download window in each periodic advertising interval. Controller circuits can be configured to, in response to acquiring a packet with synchronization data, extract the synchronization data. The periodic advertising interval can include a plurality of periodic sub-intervals and the at least one download window corresponds to the sub-intervals. The wireless standard includes primary advertising channels that are assigned for broadcast transmissions according to the at least one wireless standard.

Methods, devices and systems can include monitoring for packets with synchronization data on any of a plurality of consecutive sub-intervals in a same advertising interval. In some embodiments, each packet received during a sub-interval of the same advertising interval can include synchronization data.

Methods, devices and systems can include the periodic advertising link comprising a Bluetooth (BT) link and the sub-intervals are sub-events of the same periodic advertising interval.

Methods, devices and systems can include the synchronization data having at least a sub-interval duration and sub-interval identifier particular to the sub-interval. Synchronizing to a periodic advertising link can include determining a start of the periodic advertising intervals with at least the sub-interval identifier.

Methods, devices and systems can include determining if a packet with synchronization data received during one sub-interval includes a count value, and assigning the count value to a packet received during a sub-interval immediately following the packet with the synchronization data.

Methods, devices and systems can include, in response to acquiring a packet with synchronization data during a sub-interval, transmitting an acknowledgement packet prior to a next sub-interval.

Methods, devices and systems can include in response to transmitting an acknowledgement packet, monitoring at least one other advertising channel for a confirmation packet corresponding to the acknowledgement packet. In response to not receiving the confirmation packet within a predetermined time period, a second acknowledgement packet can be transmitted.

Methods, devices and systems can include identifying a plurality of secondary advertising channels from at least one packet received on at least one primary advertising channel; and monitoring identified secondary advertising channels for packets with synchronization data.

Methods, devices and systems can include the periodic advertising link being divided into a plurality of sub-intervals, including download subintervals that are windows in which packets from a broadcaster are expected and at least one upload sub-interval corresponding to each download subinterval. The upload sub-intervals can be windows in which the wireless device can transmit data. Monitoring non-primary advertising channels can include monitoring at time periods selected from the group of: after an upload sub-interval and a next download sub-interval and after an upload sub-interval and before a next download sub-interval.

Methods, devices and systems can include, prior to monitoring at least one non-primary advertising channel, receiving a request to synchronize with the periodic advertising link that identifies one of the sub-intervals. After synchronizing with the periodic advertising link, a timing for the identified one sub-interval can be determined, and any packet received during the identified one sub-interval can be stored.

Methods, devices and systems can include memory circuits configured to store instructions, and controller circuits can include processor circuits executing the instructions.

Methods, devices and systems can include monitoring for the packets with synchronization data in time periods between sub-intervals.

Methods, devices and systems can include, in addition to a scanning device, a broadcast device configured to transmit the plurality of packets with synchronization data during periodic advertising intervals of the periodic advertising link.

Methods, devices and systems can include a broadcast device configured to transmit the confirmation packet in response to detecting the acknowledgement packet from a scanning device.

Methods, devices and systems can include a plurality of wireless devices in communication with broadcast device over the advertising link. A broadcast device can be configured to assign at least one sub-interval to the plurality of wireless devices.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
by operation of a wireless device configured to operate according to at least one wireless standard that includes primary advertising channels:
monitoring at least one non-primary advertising channel for packets;
determining if any of the packets received during a same periodic advertising interval of a periodic advertising link include synchronization data;
in response to acquiring a packet with synchronization data, extracting synchronization data from the packet with synchronization data; and
synchronizing to the periodic advertising link with the synchronization data to determine timing for at least one download window in each periodic advertising interval; wherein
the periodic advertising interval includes a plurality of periodic sub-intervals and the at least one download window corresponds to at least one of the sub-intervals.

2. The method of claim 1, wherein monitoring the at least one non-primary advertising channel includes monitoring for packets with synchronization data on any of a plurality of consecutive sub-intervals in a same advertising interval.

3. The method of claim 2, wherein each packet received during a sub-interval of the same advertising interval includes synchronization data.

4. The method of claim 1, wherein the periodic advertising link comprises a Bluetooth (BT) link and the sub-intervals are sub-events of the same periodic advertising interval.

5. The method of claim 1, wherein:
the synchronization data includes at least a sub-interval duration and sub-interval identifier particular to the sub-interval; and
synchronizing to the periodic advertising link includes determining a start of the periodic advertising intervals with at least the sub-interval identifier.

6. The method of claim 1, wherein determining if any of the packets include synchronization data further includes
determining if a packet with synchronization data received during one sub-interval includes a count value, and assigning the count value to a packet received during a sub-interval immediately following the packet with the synchronization data.

7. The method of claim 1, further including, in response to acquiring a packet with synchronization data during a sub-interval, transmitting an acknowledgement packet prior to a next sub-interval.

8. The method of claim 7, further including:
in response to transmitting an acknowledgement packet, monitoring at least one other advertising channel for a confirmation packet corresponding to the acknowledgement packet; and
in response to not receiving the confirmation packet within a predetermined time period, transmitting a second acknowledgement packet.

9. The method of claim 1, further including:
identifying a plurality of secondary advertising channels from at least one packet received on at least one primary advertising channel; and
monitoring identified secondary advertising channels for packets with synchronization data.

10. The method of claim 1, wherein:
the periodic advertising link is divided into a plurality of sub-intervals, including download subintervals that are windows in which packets from a broadcaster are expected and at least one upload sub-interval corresponding to each download subinterval, the upload sub-intervals being windows in which the wireless device can transmit data; and
monitoring the at least one non-primary advertising channel includes monitoring for packets with synchronization data at time periods selected from the group of: after an upload sub-interval and a next download sub-interval and after an upload sub-interval and before a next download sub-interval.

11. The method of claim 1, wherein:
prior to monitoring at least one non-primary advertising channel, receiving a request to synchronize with the periodic advertising link that identifies one of the sub-intervals; and
after synchronizing with the periodic advertising link,
determining timing for the identified one sub-interval, and
storing any packet received during the identified one sub-interval.

12. A device, comprising:
wireless circuits configured to
transmit and receive packets over a plurality of channels according to at least one wireless standard,
monitor the at least one non-primary advertising channel for packets,
determine if any packets received during a same periodic advertising interval of a periodic advertising link include synchronization data, and
synchronize to the periodic advertising link with the synchronization data to determine timing for at least one download window in each periodic advertising interval;
controller circuits configured to, in response to acquiring a packet with synchronization data, extract the synchronization data; wherein
the periodic advertising interval includes a plurality of periodic sub-intervals and the at least one download window corresponds to at least one of the sub-intervals, and
the at least one wireless standard assigns primary advertising channels to broadcast transmissions.

13. The device of claim 12, wherein:
the wireless circuits are compatible with at least one Bluetooth (BT) standard; and
the sub-intervals are sub-events of the periodic advertising link.

14. The device of claim 12, further including:
memory circuits configured to store instructions; and
the controller circuits comprise processor circuits executing the instructions.

15. The device of claim 12, wherein:
the sub-intervals each have an identifier;
the synchronization data includes at least a sub-interval duration and the identifier of the sub-interval in which it was transmitted; and
the controller circuits are further configured to determine a start of the periodic advertising intervals with at least the identifier.

16. The device of claim 12, wherein:
the wireless circuits are further configured to monitor for the packets with synchronization data in time periods between sub-intervals.

17. A system, comprising:
a scanning device configured to
transmit and receive packets over a plurality of channels according to at least one wireless standard,
monitor at least one non-primary advertising channel for packets,
determine if any of the packets received during a same periodic advertising interval of a periodic advertising link include synchronization data, and
synchronize to the periodic advertising link with the synchronization data to determine timing for at least one download window in each periodic advertising interval; wherein
the periodic advertising interval includes a plurality of periodic sub-intervals and the at least one download window corresponds to the sub-intervals, and
the at least one wireless standard includes primary advertising channels that are assigned for broadcast transmissions according to the at least one wireless standard.

18. The system of claim 17, further including a broadcast device configured to transmit the plurality of packets with synchronization data during periodic advertising intervals of the periodic advertising link.

19. The system of claim 18, wherein:
the scanning device is further configured to
in response to acquiring a packet with synchronization data during a sub-interval, transmit an acknowledgement packet prior to a next sub-interval,
in response to transmitting an acknowledgement packet, monitor at least one non-primary advertising channel for a confirmation packet corresponding to the acknowledgement packet, and
in response to not receiving the confirmation packet within a predetermined time period, transmit a second acknowledgement packet; and
the broadcast device is configured to transmit the confirmation packet in response to detecting the acknowledgement packet.

20. The system of claim 18, further including:
a plurality of other wireless devices in communication with broadcast device over the advertising link; and
the broadcast device is configured to assign at least one sub-interval to the wireless device and the plurality of other devices.

* * * * *